United States Patent [19]
Hecht et al.

[11] Patent Number: 5,375,333
[45] Date of Patent: Dec. 27, 1994

[54] DEVICE FOR DETERMINING ROTARY ANGLE

[75] Inventors: Hans Hecht, Korntal; Asta Reichl, Stuttgart; Lutz Ballhause, Korb; Erwin Krimmer, Pluederhausen, all of Germany

[73] Assignee: Robert Bosch GmbH, Stuttgart, Germany

[21] Appl. No.: 29,787

[22] Filed: Mar. 11, 1993

[30] Foreign Application Priority Data

Apr. 7, 1992 [DE] Germany ............... 4211615

[51] Int. Cl.⁵ .................................. G01B 7/30
[52] U.S. Cl. ......................... 33/1 PT; 33/1 N
[58] Field of Search ............ 33/1 PT, 1 N, 534

[56] References Cited

U.S. PATENT DOCUMENTS

| 4,449,191 | 5/1984 | Mehnert | 33/1 PT |
| 5,263,258 | 11/1993 | Dobler et al. | 33/1 PT |

FOREIGN PATENT DOCUMENTS

| 3541454 | 5/1987 | Germany . | |
| 3824535 | 1/1990 | Germany . | |
| 3916864 | 11/1990 | Germany . | |
| 9012353 | 12/1990 | Germany . | |
| 4001544 | 7/1991 | Germany . | |
| 67709 | 6/1991 | Japan | 33/1 N |

*Primary Examiner*—Christopher W. Fulton
*Attorney, Agent, or Firm*—Michael J. Striker

[57] ABSTRACT

A device for contactless determination of a rotary angle has two bodies which are movable relative to one another, at least one sensor coil through which an alternating current flows and whose inductivity and alternating current resistance value changes due to a relative change of a size of regions of a first one of the bodies which regions are associated with the at least one coil and composed of a material selected from the group consisting of an electrically conductive material and ferromagnetic material, the first body being arranged with mechanical prestress relative to a second one of the bodies.

12 Claims, 3 Drawing Sheets

DEVICE FOR DETERMINING ROTARY ANGLE

BACKGROUND OF THE INVENTION

The present invention relates to a device for determining a rotary angle. In particular it relates to a device which has two bodies which are movable relative to one another and at least one sensor coil through which alternating current flows and whose inductive and alternating resistance value is changed due to relative change of the size of the regions of the bodies associated with the coil.

A device of the above mentioned general type is disclosed for example in the German document DE-OS 39 16 864.6. The coil body disclosed in this reference has a slot at its end side so that two semi-circular cores are produced. A sensor coil is wound on each of the cores and is in operative connection with a sleeve body. The sleeve body has a slot or zone of electrically non-conductive material. Since the sensor operates in accordance with the so-called eddy current principle, the measuring signal can be distorted by eventual wobbling movements which change the distance between the coil and the inner side of the sleeve body. This negatively influences the accuracy of the measuring signal and thereby the determination of the rotary angle.

The German document DE-OS 38 24 535.3 discloses another device for determination of a rotary angle, which operates in accordance with the eddy current principle. In this document the sleeve body is arranged on the coil body. However, here also the measuring signal can be distorted due to frictional losses between these parts.

SUMMARY OF THE INVENTION

Accordingly, it is an object of the present invention to provide a device for determining the rotary angle, which avoids the disadvantages of the prior art.

In keeping with these objects and with others which will become apparent hereinafter, one feature of the present invention resides, briefly stated, in that one of the bodies of the inventive device is arranged with a mechanical prestress relative to another of the bodies.

When the device is designed in accordance with the present invention, a measuring signal is produced with a relatively higher accuracy than in the prior art devices. The distance between the rotary part and the coil no longer affects the measuring signal. The measuring ring snaps directly on the coil or on the coil body without a gap therebetween, so that the wobbling movements of the rotary part can no longer act on the measuring signal. The measuring signal is completely independent of the bearing play of the driver which transmits the rotary movement to the shaft to be monitored.

The measuring ring does not require a special bearing and can be guided directly in or on the coil body. Since it suffices to snap the measuring ring on, the mounting is very simple. Furthermore, it is possible to assemble the structural parts to form pre-mounted units, so that an end mounting is very simply and fast. During the operation of the device the distance between the coil or the coil carrier and the measuring parts is automatically adjusted to a constant value. Therefore there is no aging process with regard to distance. Also, a constant distance is maintained despite temperature fluctuations.

In accordance with another feature of the present invention, the coil or coils can be arranged on the second body which serves as a coil body.

The coil body can be composed of at least two portions which are offset in an axial direction and also offset in a radial direction by 180° and the coils can be mounted on the portions.

Still another feature of the present invention is that the first body can be mounted on a driver which provides a rotary movement for joint rotation with the driver.

Finally, in accordance with another feature of the present invention, the first body can be in operative connection with the driver which provides the rotary movement, the driver can be rotatably supported in the second body, and the spring which operates as a return spring for the first body can be arranged between the first body and the second body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
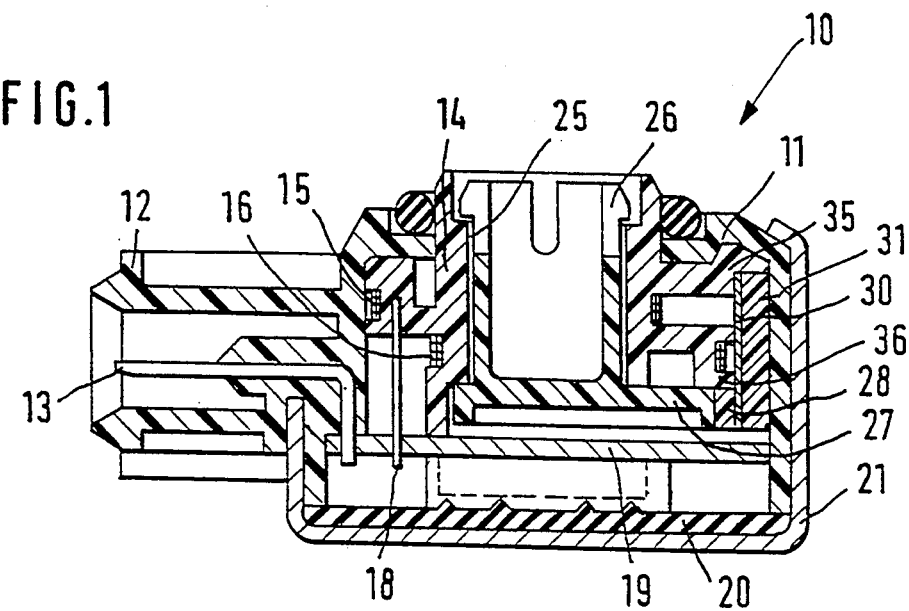
FIG. 1 is a view showing a longitudinal section of a device for determining a rotary angle in accordance with the present invention.

A measuring device for determining a rotary angle shown in FIG. 1 is formed as a throttle valve position sensor 10. The throttle valve position sensor measures the turning position of the throttle valve arranged in the suction pipe of an internal combustion engine. It is mounted on a shaft for joint rotation with it and therefore produces an electrical output signal corresponding to the rotary or turning angle of the throttle valve from its rest position.

The throttle valve position sensor 10 has a housing 11 with an integrated plug housing 12 located at one side and provided for an electrical plug contact 13. A coil body 14 is inserted in the housing 10. Two coils 15 and 16 are wound on the coil body 14. Both coils 15 and 16 are connected with electrical components of an electrical circuit plate 19 by electrically insulated electrical conductors 18. The circuit plate 19 is in contact with the plug contact 13. The circuit plate 19 forms an intermediate bottom in the housing 11, while a sealing and dampening plate 20 is located under the intermediate bottom and forms a closure for the housing 10. The housing 10 is surrounded by a screening cap 21 which is composed, for example, of steel, aluminum, bronze and provides a protection from electromagnetic radiation.

The coil body 14 has a substantially central, through-going opening 25 which accommodates a driver 26. The driver 26 has the function of an adaptor for connecting the shaft whose rotary movement is to be determined, to the measuring device and in particular to the throttle valve position sensor 10 disclosed here. The driver 26 has a projection 27 extending between the coil body 14 and the circuit plate 19. A groove 28 is formed in the projection 27 and a measuring ring 30 is inserted fixedly in the groove. The measuring ring 30 covers the periphery of the coil body 14 over an angular region of approximately 210° and has a height which at least overlaps the height of both coils 15 and 16. The measuring ring 30 is composed of electrically conductive material and/or ferromagnetic material. The measuring ring 30 is arranged on an insert member 31 composed of synthetic plastic material, in particular of electrically non-conductive material, so that the ends of the measuring ring 30 are inserted in the insert member for its fixing. The measuring ring 30 in accordance with the present invention has a mechanical prestress, so that during mounting it can be snapped on the coil body 14 and thereafter slidingly seated on it. When the mechanical prestress of the measuring ring is selected, the friction of the coil body 14 on the measuring ring 30 must be retained as low as possible. It is however also possible to arrange the mounting ring 30 not on the coil body 14, but instead directly on the coils 15, 16.

The coil body 14 is composed preferably of electrically non-conductive material and subdivided into two portions 35 and 36 which are offset relative to one another in an axial direction. The portions 35, when seen in a cross-section are approximately sickle-shaped or D-shaped. Further, the portions 35 and 36 are offset relative to one another by 180° in a radial direction. Therefore, when the portions 35 and 36 are D-shaped, the approximately flat surfaces or surfaces with the greater radius face toward one another. In any case, the portions 35 and 36 must surround correspondingly the axle, or in another words the driver 26. The coils 15 and 16 are correspondingly wound on the portions 35 and 36 in a peripheral direction of the coil body 14 and formed for example as wire coils. Due to the axial offset of the portions 35 and 36, it is possible to wind both coils during the manufacturing process in a simple manner with a winding machine without additional substantial conversion. In particular both coils 15 and 16 can be wound simultaneously so that only one working step is needed. Due to the offset of the portions relative to one another in a radial direction by 180°, the coil 15 is spaced by a maximum distance from the measuring ring 30, while simultaneously the coil 16 is spaced from the measuring ring 30 by a minimum distance. During the rotation of the measuring ring 30 relative to the coil body, the distance of the coils 15 and 16 relative to the measuring ring 30 changes in opposite directions.

In the initial position the measuring ring 30 is oriented so that it overlaps both coils 15 and 16 with approximately equal peripheral surfaces. The measuring device can operate in accordance with the inductive and/or eddy current principle, wherein in both cases an alternating current is supplied through the coils 15 and 16. For providing the measurements, the measuring ring 30 is turned around the coil body 14 or moved around it over a desired angular region, or in other words the position of the measuring ring 30 and the coils 15, 16 relative to one another is changed. For this purpose the rotation of the throttle valve by means of the shaft is transmitted to the driver 26. The drive 26 moves proportionally to the rotation of the throttle valve, while the coil body remains stationary. Since the measuring ring 30 is fixedly arranged on the projection 27 of the driver 26, it also performs a rotary movement proportional to the throttle valve. A further measuring signal generation by means of the eddy current principle will be illustrated hereinbelow. When an alternating current, in particular a high frequency alternating current, flows through the coils 15, 16 a magnetic alternating field is produced on the coils 15, 16 and acts on the metallic surface of the measuring ring 30. The greater the surface of the measuring ring 30 through which the magnetic field passes, the higher eddy current is produced. The magnitude of the produced eddy current is dependent on the utilized material of the measuring ring 30 as well as on the distance of the individual coils 15 and 16 from the surface of the measuring ring 30. Due to the eddy current produced on the measuring ring 30, the coil alternating current resistance of both coils 15 and 16 changes, and this is used for producing a measuring signal. Since simultaneously the coil inductivity reduces, the inductivity change can also be utilized for producing a measuring signal (coil inductivity evaluating method). During the rotary movement of the measuring ring 30 the surface of the measuring ring 30 which is associated with the corresponding coil 15 and 16 changes in opposite directions. For example the surface of the measuring ring 15 which is associated with the coil 30 is increased by the amount, by which it is reduced relative to the coil 16. Both coils 15 and 16 are for example connected in a Wheatstone semi-bridge circuit when the method of the coil alternating current resistance is utilized. Thereby the measuring errors which simultaneously occur in the coils 15 and 16 and act in opposite directions are compensated. In particular, this connection with the coils 15, 16 compensates for example errors resulting from temperature fluctuations.

Instead of the above described eddy current principle, also the inductive measuring method can be utilized as mentioned hereinabove. In this case however the measuring ring 30 must be composed of ferromagnetic material on the surfaces facing the coils 15, 16. For this purpose the measuring ring 30 can be composed of ferromagnetic material or a ferromagnetic layer can be applied on it. In contrast to the eddy current principle, the penetration depth of the electromagnetic alternating field of the coils 15, 16 is smaller. While during the eddy current principle the coil inductivity is reduced, in the inductive method, depending on the ferromagnetic and electrically conductive properties of the material (ferromagnetic effect) it can increase.

Since the measuring principle is correspondingly dependent on the distance of the coils 15, 16 from the surface of the measuring ring 30, in the inventive arrangement an approximately complete suppression of an error caused for example by wobble movements of the shaft can be achieved. Further, the angular region of the measuring ring 30 is not limited to 210°. This angular region is considered in the practice as especially favorable, while a greater, approximately linear region of the calibration curve can be obtained with a greater measuring angle.

Figure 2:
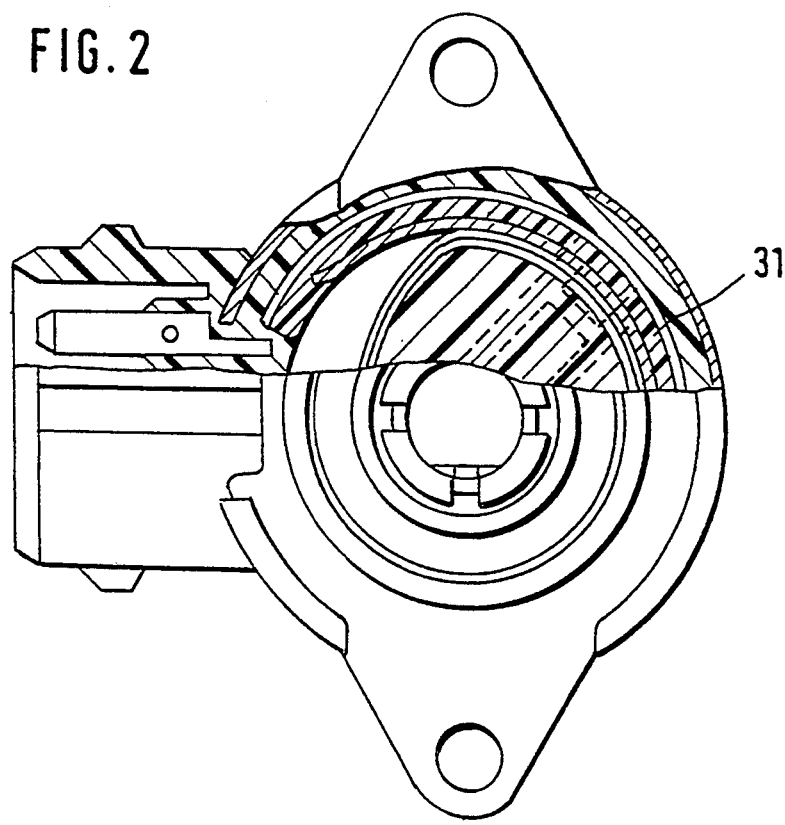
FIG. 2 is a plan view of the inventive device shown in FIG. 1.
Figure 3:
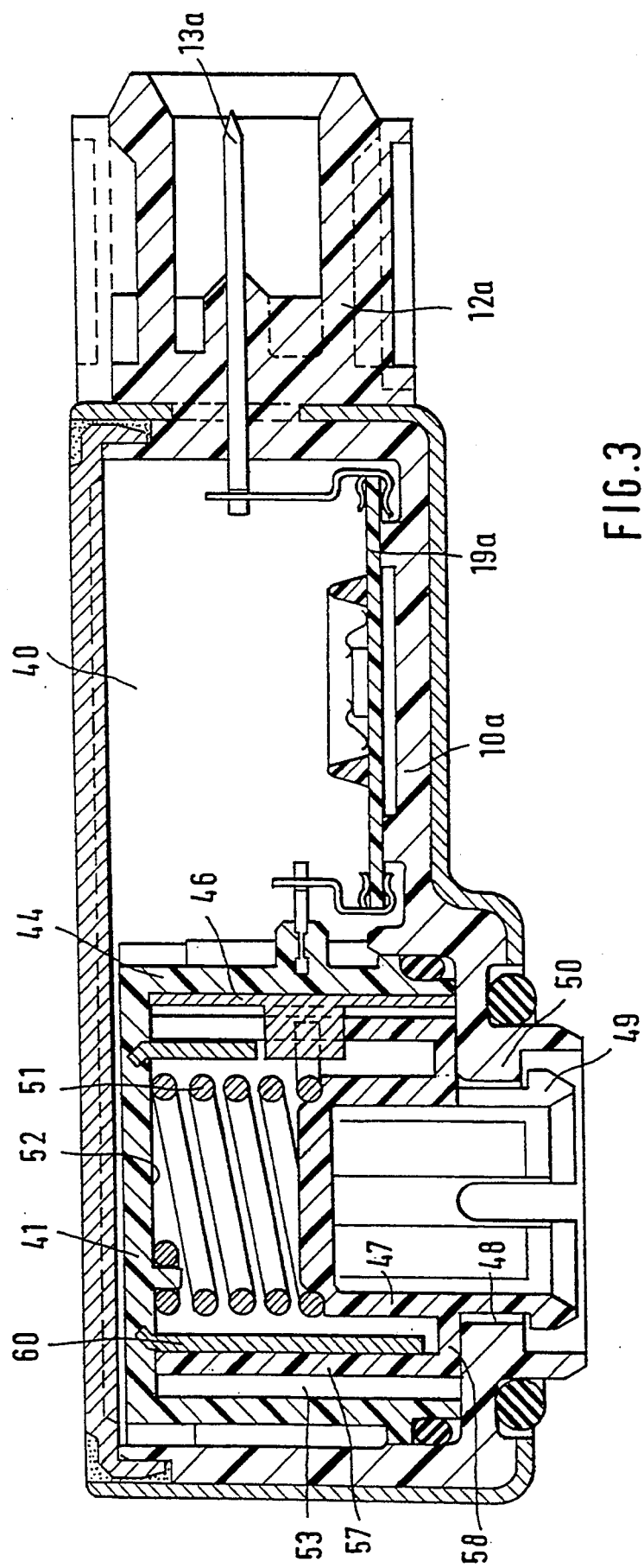
FIG. 3 is a view showing a longitudinal section of a device for determining a rotary angle in accordance with another embodiment of the invention.
Figure 4:
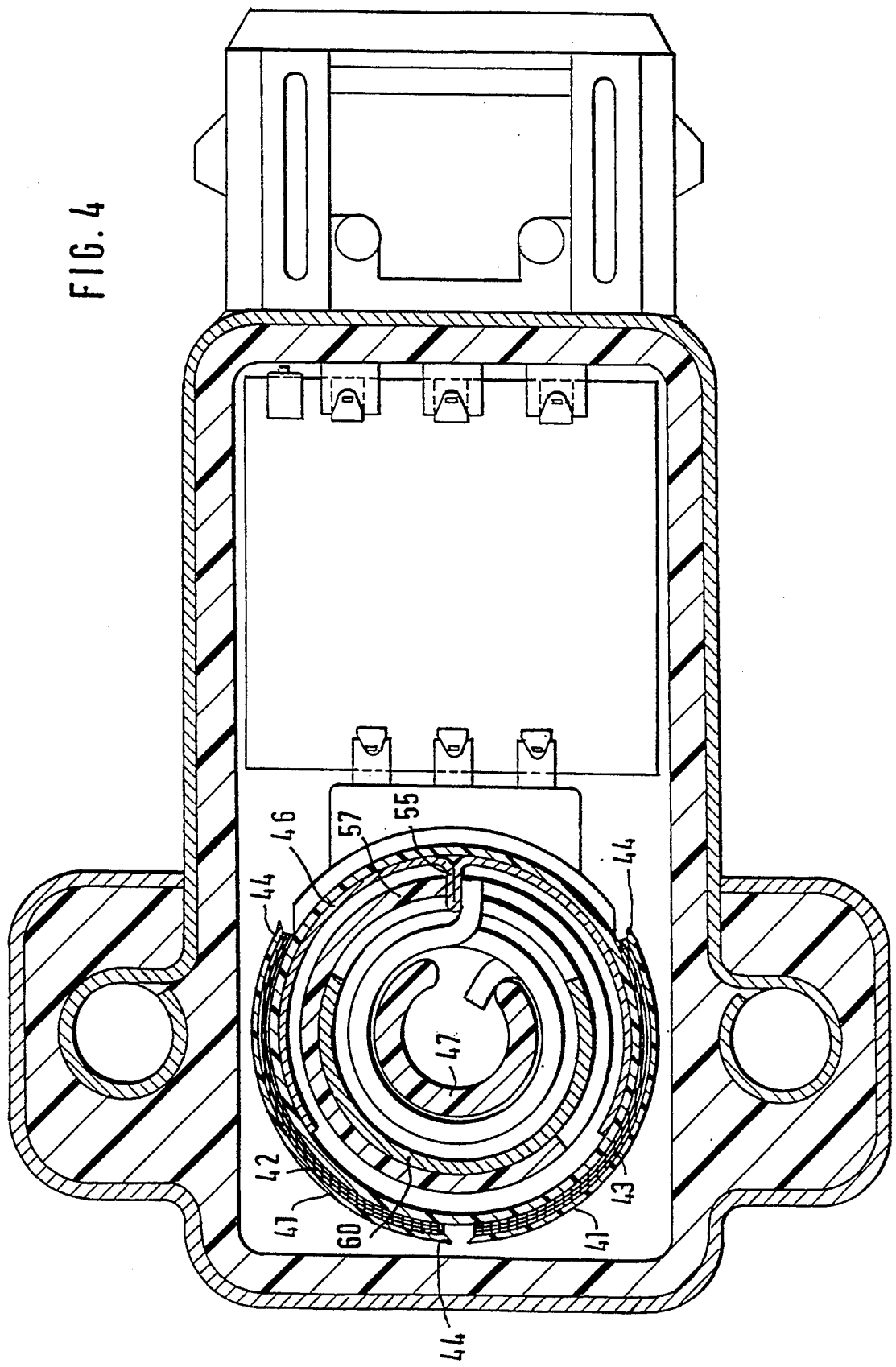
FIG. 4 is a plan view of the inventive device shown in FIG. 3.

In the embodiment shown in FIGS. 1 and 2 the measuring ring 30 is arranged on the coil body 14 or in other words on the coils 15 and 16 and surrounds them from outside. The measuring ring shown in FIGS. 3 and 4 is however located inside the coil body or the coils. The housing 10a has an integrated plug housing 12a for the electrical plug contact 13a. In contrast to the other embodiment, the circuit plate 19a is not formed as an intermediate plate, but instead is arranged in a chamber 40 of the housing 10a. The coil body 41 has a cup-shaped design and is fixed in the housing 10a. Two coils 42 and 43 are arranged on its outer wall and cover an angular region of correspondingly approximately 120°. The coils 42, 43 have a rectangular design. With the use of the wire coils, the wire is wound on two hooks 44. Thereby two coil tracks extending over the above mentioned angular region of 120° are produced, and one of the tracks is shown in FIG. 4. It is especially advantageous to utilize here flat coils which are glued to the wall of the coil body 41 or applied for example by thick film technology.

The driver 47 extends in the opening of the coil 41. The shaft whose rotary movement is to be measured is inserted in the driver 47. The driver 47 has a ring groove 48 and a projection 49 engaging in the housing opening 50 and snapped in it. One end of a spring 51 abuts against a bottom 52 of the coil body 41, while the other end of the spring 41 is located in a recess 53 formed on the driver 47. The end of the spring 51 abuts against a fold 55 of a sliding ring 46. The fold 55 and thereby the abutment region of the spring 51 is located on the sliding ring 46 substantially diametrically opposite to the region in which both coils 42, 43 almost abut against one another or are arranged at the smallest distance from one another in a peripheral direction. Due to this arrangement the sliding ring 46 in the initial position overlaps both coils 42, 43 by the same distance.

The spring 51 has the purpose of moving back the sliding ring 46 after the deviation to its initial position. Further, the spring 51 provides a play-free arrangement of the driver 47 in the coil body 41 during the rotary movement. The rotary movement of the driver 47 is transmitted to the sliding ring 46 by a ring-shaped driving member 57. The driving member 57 is connected with the driver 47 by a projection 58 in a force-transmitting member. On the other hand it abuts with an end against the fold 55 of the sliding ring 46 at the side opposite to the spring 51. In order to provide a uniform, play-free drive of the sliding ring 47, the driving member 57 is supported slidingly on a projection 60 of the coil body 41. The projection 60 abuts against the driving member 57 and extends between the driving member 57 and the spring 51 into the coil body 41. The projection 60 simultaneously serves as a rotary angle limiting member, for preventing overstressing of the spring 51. The projection 60 serves also as a screening sheet between the spring and the coils.

The generation of the measuring signal in this embodiment corresponds to the operation of the embodiment of FIGS. 1 and 2. A rotary movement which is to be determined is transferred by the driver 47 and the driving member 57 to the sliding ring 46. The sliding ring 46 is moved against the force of the spring 51, and the overlapping of the sliding ring 46 with one coil 42 reduces by an amount by which the overlapping of the sliding ring 46 with the other coil 43 increases. For further measuring signal generation the above provided description is sufficiently explanatory, it is to be understood that different forms of the coils can be used in both embodiments.

When the driver 47 is again moved back to its initial position, then due to the force of the spring 51 the sliding ring 46 is again displaced back to its initial position and the sliding ring 46 again has overlapping with both coils 42, 43 for example of the same size. In this embodiment again due to its mechanical prestress the sliding ring during the mounting can be snapped in the protective casing 44 in a very simple manner, so that the distance between the sliding ring 46 and the coils 42, 43 is independent of wobble movements or other causes of potential errors.

It will be understood that each of the elements described above, or two or more together, may also find a useful application in other types of constructions differing from the types described above.

While the invention has been illustrated and described as embodied in a device for contactless determination of a rotary angle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for contactless determination of a rotary angle, comprising two bodies which are movable relative to one another; at least one sensor coil through which an alternating current flows and whose inductivity and alternating current resistance value changes due to a relative change of a size of regions of a first one of said bodies which regions are associated with said at least one coil and composed of a material selected from the group consisting of an electrically conductive material and ferromagnetic material, said first body being arranged with mechanical prestress toward a second one of said bodies.

2. A device as defined in claim 1; and further comprising a second coil through which alternating current flows and whose inductivity and alternating current resistance value changes due to a relative change of a size of regions of said first body, which regions are associated with said further coil and composed of a material selected from the group consisting of an electrically conductive material and a ferromagnetic material, said first body being arranged with mechanical prestress directly on said coils.

3. A device as defined in claim 2, wherein said second body is formed as a coil body, said coils being arranged on said coil body.

4. A device as defined in claim 2, wherein said second body formed as a coil body has at least two sections which are offset in an axial direction and by 180° in a radial direction, said coils being arranged on said sections of said coil body.

5. A device as defined in claim 1, wherein said second body is formed as a coil body, said at least one coil being arranged on said coil body.

6. A device as defined in claim 1; and further comprising a driver which provides a rotary movement, said first body being arranged on said driver.

7. A device as defined in claim 1; and further comprising a driver which provides a rotary movement, said first body being in operative connection with said driver, said driver being rotatably supported in said second body.

8. A device as defined in claim 7; and further comprising a spring which serves as a return spring for said first body and is arranged between said first body and said second body.

9. A device as defined in claim 1, wherein said first body is arranged with mechanical prestress directly on said at least one sensor coil.

10. A device for contactless determination of a rotary angle, comprising two bodies which are movable relative to one another; at least one sensor coil through which an alternating current flows and whose inductivity and alternating current resistance value changes due to a relative change of a size of regions of a first one of said bodies which regions are associated with said at least one coil and composed of a material selected from the group consisting of an electrically conductive material and ferromagnetic material, said first body being arranged with mechanical prestress on a second one of said bodies.

11. A device as defined in claim 10, wherein said first body is arranged with mechanical prestress directly on said at least one sensor coil.

12. A device as defined in claim 10; and further comprising a second coil through which alternating current flows and whose inductivity and alternating current resistance value changes due to a relative change of a size of regions of said first body, which regions are associated with said further coil and composed of a material selected from the group consisting of an electrically conductive material and a ferromagnetic material, said first body being arranged with mechanical prestress directly on said coils.

* * * * *